United States Patent [19]

Häkli

[11] 4,404,917
[45] Sep. 20, 1983

[54] METHOD AND DEVICE FOR PLANTING PLANTS

[75] Inventor: Reijo S. Häkli, Iso-Vimma, Finland

[73] Assignee: Lännen Tehtaat Oy, Iso-Vimma, Finland

[21] Appl. No.: 276,377

[22] PCT Filed: Oct. 28, 1980

[86] PCT No.: PCT/FI80/00003
§ 371 Date: Jun. 15, 1981
§ 102(e) Date: Jun. 15, 1981

[87] PCT Pub. No.: WO81/01351
PCT Pub. Date: May 28, 1981

[30] Foreign Application Priority Data

Nov. 13, 1979 [FI] Finland .................. 793547

[51] Int. Cl.³ .................. A01C 11/02
[52] U.S. Cl. .................. 111/3
[58] Field of Search .................. 111/2, 3

[56] References Cited

U.S. PATENT DOCUMENTS

| | | | |
|---|---|---|---|
| 474,425 | 5/1892 | Updike | 111/3 |
| 2,163,802 | 6/1939 | Oakley | 111/3 |
| 3,719,158 | 3/1973 | Roths | 111/2 |
| 4,132,337 | 1/1979 | Masuda et al. | 111/2 X |
| 4,289,080 | 9/1981 | Penley | 111/3 |

FOREIGN PATENT DOCUMENTS

| | | | |
|---|---|---|---|
| 504563 | 7/1930 | Fed. Rep. of Germany | 111/3 |
| 627325 | 8/1949 | United Kingdom | 111/3 |

*Primary Examiner*—James R. Feyrer
*Attorney, Agent, or Firm*—Burns, Doane, Swecker & Mathis

[57] ABSTRACT

Method and device for planting pot plants with a planting machine travelling on the ground so that a planting furrow is formed by means of a plough-share. The plants are fed into a planting device of the machine. The planting device grasps a plant, lowers the plant down towards the planting furrow, and lets the plant loose above the planting furrow. Thereupon, the plants having assumed a substantially vertical position in the planting furrow, the planting furrow is closed by a pair of pressing wheels. As the plant is detached from the planting device, the component of the speed of the planting device and of the plant, opposite to the direction of travel of the machine, in relation to the machine, is substantially higher than the speed of the machine in relation to the ground.

11 Claims, 2 Drawing Figures

METHOD AND DEVICE FOR PLANTING PLANTS

The present invention is concerned with a method for planting pot plants by means of a planting machine travelling on the ground so that a planting furrow is formed and the plants are fed into the planting means of the planting machine, which planting means grasps a plant, lowers the plant down towards the planting furrow and disengages the plant above the planting furrow, after which, when the plant has assumed a substantially vertical position in the planting furrow, the furrow is closed. The invention is also concerned with a device for applying the method, which device comprises a ploughing plough-share for forming the planting furrow, a planting means, equipment for feeding the plants into the planting means as well as means for closing the planting furrow.

Planting methods are previously known in which the plant is introduced into the furrow ploughed by the plough-share at a speed equal to the travelling speed but of opposite direction. The plant is pressed either by two disks or by various clamps. A method is known in which the plant is dropped through a vertical chute into the furrow, which is being filled after the plough-share. Likewise, a method is known in which the plant is dropped through a tube in between two resilient walls of pins, the speed of the walls being equal to the travelling speed but of opposite direction. A method is also known in which the plant is introduced inside the plough-share behind a pushing means and in which the pushing means pushes the plant into the furrow substantially at the travelling speed.

It is a common feature of all of the known methods that the plant is placed into the furrow and kept upright by means of various methods until the compacted soil supports the plant. Likewise, it is a common feature especially of automatic planting machines that the plant feeding equipment and the equipment for introducing the plant into the ground are separate.

The method in accordance with the present invention is characterized in that when the plant is disengaged from the planting means, the component of the speed of the planting means and the plant opposite to the travelling direction of the planting machine in relation to the planting machine is substantially higher than the speed of the planting machine in relation to the ground surface. The device in accordance with the invention is characterized in that the planting means consists of a device that transports a plant above the planting furrow, close to the ground level at a speed whose component opposite to the travelling direction of the planting machine in relation to the planting machine is substantially higher than the speed of the planting machine in relation to the ground surface. In the device in accordance with a preferred embodiment of the invention, when pot plants placed in a chain formation are being planted, a first pair of rollers pulls the chain and, by means of the speed of rotation of the rollers in relation to the travelling speed, determine the spacing of plants. A second pair of rollers, having a higher speed of traction, cuts the chain along perforations, and belts driven by the upper parts of the pair of rollers throw the pots of plants, pressing their upper parts, at a speed substantially higher than the travelling speed, into the furrow being closed after the plough-share.

An advantage of the method is the simplicity of the way of planting the plants at desired spacing of plants in their correct planting position. With the device in accordance with the invention, a simple automatic planting machine is provided by means of which a very high planting capacity is achieved. An advantage is the continuous rotary movement of all of the mobile parts.

BRIEF DESCRIPTION OF THE DRAWINGS

The invention will be described more closely below with reference to the attached drawings, wherein.

DETAILED DESCRIPTION OF THE PREFERRED EMBODIMENT

Figure 1:
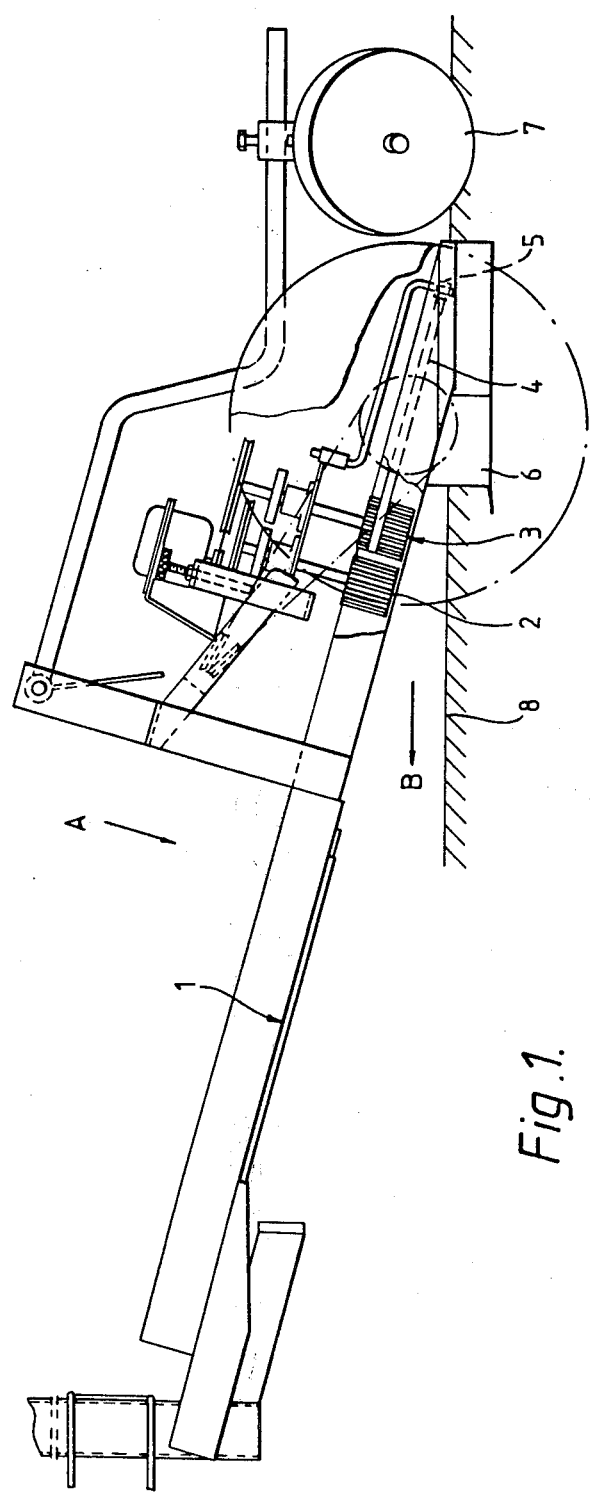
FIG. 1 is a schematical side view of the device in accordance with the invention and FIG. 2 is a schematic view of the same device in the direction of the arrow A, without the wheels for closing the furrow.
Figure 2:
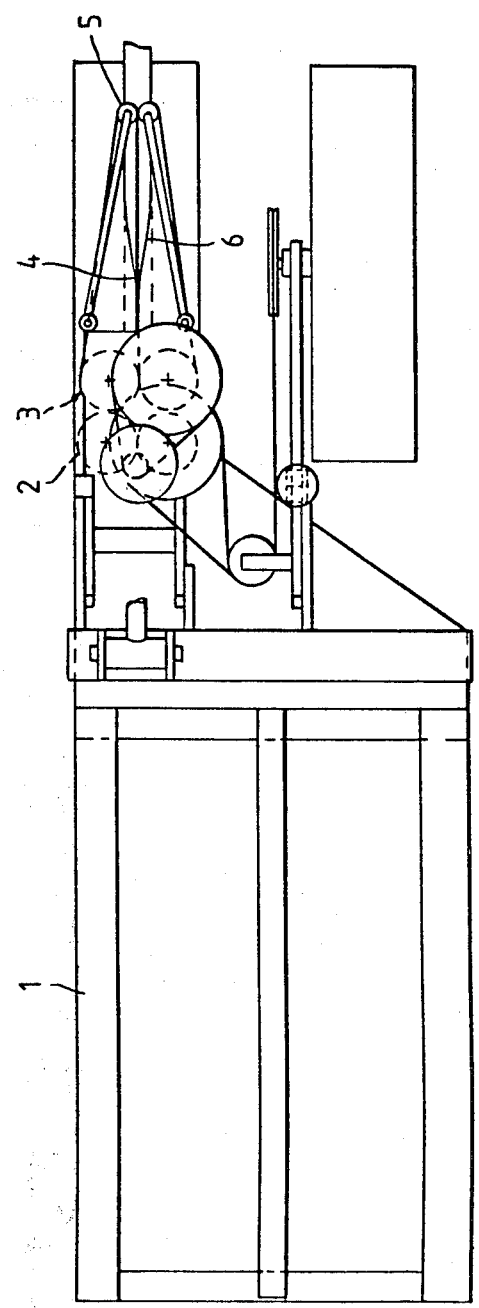

The plant holder 1 of the planting machines has (not shown in the drawing) a number of pot plants, from which the plants can be pulled as a continuous chain. The travelling direction of the planting machine is denoted with the arrow B. A pair of rollers 2 consisting of resilient rollers rotate in opposite directions so that they pull the chain of plants between them from the left to the right in the figure. The speed of traction of the rollers 2 in relation to the travelling speed of the planting machine determines the spacing of the plants after planting. A second pair of rollers 3 consisting of resilient rollers likewise rotate in opposite directions, but at a higher speed as compared with the pair of rollers 2. When the end of the plant chain comes between the rollers 3 rotating at a higher speed, an individual plant is detached from the end of the chain when the perforation between the plants is torn.

A pair of belts 4, driven by the rollers in the pair of rollers 3, is fitted around the rollers in the pair of rollers 3 and two pulleys 5. From between the rollers 3 the detached plant comes between the belts 4, which grasp the upper part of the pot compressing it between the belts. The pulleys 5 are pressed against each other resiliently so that the plant finally passes between them. The component parallel to the ground surface of the speed of the pair of belts in relation to the machine is higher than the speed of the planting machine in relation to the ground, whereby the plant, when becoming detached from between the belts, is thrown backwards in relation to the direction of travel of the machine. The horizontal components of the speed of the pair of belts and of the travelling speed of the device are of opposite directions. The difference between these components corresponds to the horizontal component of the disengaging speed of the plant in relation to the ground.

Underneath the pair of belts 4 there is a plough-share 6, which opens the planting furrow while the machine moves. The pair of belts 4 descends above the plough-share 6 almost to the level of the ground surface, whereby the distance of free throwing of the plant is short. A pair of pressing wheels 7 passing behind the plough-share 6 closes the furrow and compacts the soil around the plant.

The belts 4 form an angle with the ground surface 8, which angle is at the maximum about 45°, appropriately at the maximum about 30°, and preferably about 15°. In such a case the plants, which are placed perpendicularly to the belts, are detached from between the belts at a slightly backwardly inclined position but meet the ground surface at a substantially vertical position.

When the angle of inclination is about 15°, an appropriate travel speed is about 1.0 m/s (meters per second) and an appropriate speed of the belts about 1.8 m/s. It is important that the component parallel to the ground surface of the speed of the belts is substantially, i.e. at least about 0.5 m/s, preferably about 0.8 m/s higher than the travelling speed of the machine. An appropriate height of the final end of the belt from the bottom of the planting furrow is about 6 cm. It is clear that the most advantageous dimensioning depends, e.g., on the height and weight of the plant pots.

The invention is not restricted to the above embodiment only, but considerable variation is contemplated within the scope of the patent claims. Depending on the types of the plants, the means of separation and feeding of the plants may also be subject to considerable variation. In the embodiment shown in the drawing, the movements of all of the mobile units have been connected to each other by means of drive belts, whereby it is possible to determine the transmission ratios and the speeds of rotation of the various units by means of the diameters of the pulleys. In this way it is possible to interrelate the plant throwing speed with the travel speed of the device. Of course, it is also possible to employ other types of transmissions in order to produce the movement of the various units.

I claim:

1. A method for planting pot plants with a planting machine travelling on the ground, comprising the steps of driving the machine along the ground, forming a planting furrow, feeding one of the plant pots into a rotary planting means of the planting machine, grasping the plant pot in a generally vertical position with a pair of opposed belts of the planting means having vertical faces, moving the plant pot down towards the planting furrow with the belts, throwing the plant pot from the planting means into the planting furrow with the plant stem above the ground level, depositing the plant pot directly into the furrow from the planting means, closing the furrow when the plant pot has attained a substantially vertical position in the planting furrow as the plant pot abuts soil being pressed into the furrow during closing of the furrow, disengaging the plant pot from the planting means when the component of the speed of the planting means and the plant in relation to the planting machine, which component is opposite to the travelling direction of the planting machine, is at least 1.5 times greater than the speed of the planting machine in relation to the ground surface.

2. A method as claimed in claim 1 or 2, wherein the direction of movement of the plant forms an angle of about 135° to 170° with the direction of travel of the planting machine when the plant is disengaged from the planting means.

3. A method as claimed in claim 2, wherein the angle is 165°.

4. A method as claimed in claim 1, wherein the plant is disengaged from the planting means when the component of the speed of the plant opposite to the travel direction of the planting machine in relation to the planting machine is at least about 0.8 m/s higher than the speed of travel of the planting machine in relation to the ground surface.

5. A method as claimed in claim 1 or 4, further comprising the step of backwardly inclining the plant in relation to the direction of travel of the planting machine when the plant is disengaged from the planting means.

6. A method as claimed in claim 5, wherein when the plant is disengaged from the planting means, the plant forms an angle of about 80° to 45° with the ground surface.

7. A method as claimed in claim 6, wherein the angle is 75°.

8. A device for planting pot plants with a planting machine travelling on the ground, comprising means for driving the planting machine along the ground, a ploughing plough-share for forming a planting furrow, rotary planting means, means for feeding individual plant pots into the planting means, said planting means being adapted to move and directly deposit the plant pots into the open furrow, means for closing the planting furrow as plant pots are deposited therein, the planting means including a pair of opposed belts having vertical faces that grasp a plant pot in a generally vertical position and throw a plant pot into the planting furrow with the plant stem above the ground level, said belts having a speed whose component opposite to the travelling direction of the planting machine in relation to the planting machine is at least 1.5 times greater than the speed of the planting machine in relation to the ground surface, whereby the thrown plant pot attains a substantially vertical orientation as it abuts soil being pressed into the furrow by the furrow closing means.

9. A device as claimed in claim 8, wherein the planting means includes a device that detaches a plant pot included in a chain of pots from the end of the chain.

10. A device as claimed in claim 9, in which the planting means comprises a pair of belts for depositing the plants in the furrow, said belts forming an angle of about 45° to 10° with the ground surface.

11. A device as claimed in claim 10, wherein the angle is 15°.

* * * * *